US010552795B2

(12) United States Patent
Hushyar et al.

(10) Patent No.: US 10,552,795 B2
(45) Date of Patent: *Feb. 4, 2020

(54) MODIFYING ORIGINAL GEOGRAPHIC LOCATION FOR VIEWING BY A USER IN A MULTILINGUAL COLLABORATIVE GAMING ENVIRONMENT

(71) Applicant: AT&T Intellectual Property II, L.P., Atlanta, GA (US)

(72) Inventors: Kaveh Hushyar, Saratoga, CA (US); Mostafa Tofighbakhsh, Cupertino, CA (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,988

(22) Filed: Aug. 30, 2017

(65) Prior Publication Data
US 2017/0364865 A1  Dec. 21, 2017

Related U.S. Application Data

(63) Continuation of application No. 13/539,952, filed on Jul. 2, 2012, now Pat. No. 9,754,241, which is a continuation of application No. 12/627,421, filed on Nov. 30, 2009, now Pat. No. 8,214,435, which is a continuation of application No. 11/687,800, filed on Mar. 19, 2007, now Pat. No. 7,631,040.

(51) Int. Cl.
*G06F 15/16* (2006.01)
*G06F 15/173* (2006.01)
*G06F 15/177* (2006.01)
*G06Q 10/10* (2012.01)
*G06Q 40/04* (2012.01)

(52) U.S. Cl.
CPC .............. *G06Q 10/10* (2013.01); *G06Q 40/04* (2013.01)

(58) Field of Classification Search
CPC ........ G06Q 10/10; G06Q 40/04; G06F 15/16; G06F 15/173
USPC ...................................................... 726/204
See application file for complete search history.

(56) References Cited

U.S. PATENT DOCUMENTS

| | | | | |
|---|---|---|---|---|
| 6,873,854 | B2 * | 3/2005 | Crockett ................. | H04M 3/56 455/518 |
| 7,330,971 | B1 * | 2/2008 | Kukreja ................. | H04L 63/083 709/203 |
| 7,631,040 | B1 | 12/2009 | Hushyar et al. | |
| 7,801,542 | B1 * | 9/2010 | Stewart .................. | G06Q 50/01 455/518 |
| 7,908,324 | B2 * | 3/2011 | Shochet .................. | H04L 51/04 463/40 |
| 2002/0169592 | A1 * | 11/2002 | Aityan .................. | G06F 17/289 704/2 |

(Continued)

*Primary Examiner* — Haresh N Patel

(57) ABSTRACT

Disclosed are systems, methods, and computer readable media for providing a collaborative communication environment. The method embodiment comprises receiving user profiles, establishing a collaborative communication environment where a plurality of users simultaneously interact over a network, converting data to be sent to each user in a collaborative environment based on the respective user's profile, and presenting a localized experience to each user using the converted data.

20 Claims, 3 Drawing Sheets

(56) References Cited

U.S. PATENT DOCUMENTS

| | | | |
|---|---|---|---|
| 2003/0154249 A1* | 8/2003 | Crockett | H04W 4/08 709/204 |
| 2004/0003041 A1* | 1/2004 | Moore | G06Q 20/085 709/204 |
| 2004/0030750 A1* | 2/2004 | Moore | H04L 12/14 709/204 |
| 2004/0153557 A1* | 8/2004 | Shochet | H04L 51/04 709/229 |
| 2005/0030225 A1* | 2/2005 | Motoyama | G01S 19/51 342/357.57 |
| 2005/0188062 A1* | 8/2005 | Li | H04W 8/005 709/220 |
| 2005/0202817 A1* | 9/2005 | Sudit | G01S 5/0072 455/433 |
| 2005/0227676 A1* | 10/2005 | De Vries | H04L 12/5895 455/414.1 |
| 2006/0003305 A1 | 1/2006 | Kelmar | |
| 2006/0015637 A1 | 1/2006 | Chung | |
| 2006/0041503 A1 | 2/2006 | Blair et al. | |
| 2006/0128469 A1* | 6/2006 | Willis | A63F 13/61 463/42 |
| 2007/0073803 A1* | 3/2007 | Terrill | G06Q 50/22 709/203 |
| 2007/0099701 A1* | 5/2007 | Simon | G06Q 30/02 463/40 |
| 2007/0143410 A1* | 6/2007 | Kraft | G06Q 10/107 709/206 |
| 2007/0154876 A1* | 7/2007 | Harrison, Jr. | G09B 5/06 434/365 |
| 2007/0173326 A1* | 7/2007 | Jennings | G06F 17/30 463/42 |
| 2007/0218891 A1* | 9/2007 | Cox | G01C 21/20 455/422.1 |
| 2007/0233585 A1 | 10/2007 | Simon et al. | |
| 2008/0022309 A1* | 1/2008 | Begeja | H04N 7/165 725/46 |
| 2008/0049027 A1* | 2/2008 | Hauke | H04N 7/163 345/502 |
| 2008/0049767 A1* | 2/2008 | Koltenuk | H04L 63/102 370/401 |
| 2008/0126481 A1* | 5/2008 | Chakra | H04L 51/063 709/204 |
| 2008/0182660 A1* | 7/2008 | Fulton | G06F 21/316 463/29 |
| 2008/0306807 A1* | 12/2008 | Amento | G06Q 30/02 705/7.33 |
| 2009/0029777 A1 | 1/2009 | Holt et al. | |

* cited by examiner

MODIFYING ORIGINAL GEOGRAPHIC LOCATION FOR VIEWING BY A USER IN A MULTILINGUAL COLLABORATIVE GAMING ENVIRONMENT

PRIORITY INFORMATION

The present application is a continuation of U.S. patent application Ser. No. 13/539,952, filed Jul. 2, 2012, now U.S. Pat. No. 9,754,241, issued on Sep. 5, 2017, which is a continuation of U.S. patent application Ser. No. 12/627,421, filed Nov. 30, 2009, now U.S. Pat. No. 8,214,435, issued on Jul. 3, 2012, which is a continuation of U.S. patent application Ser. No. 11/687,800, filed Mar. 19, 2007, now U.S. Pat. No. 7,631,040, issued Dec. 8, 2009, the contents of which are incorporated herein by reference in their entirety.

BACKGROUND OF THE INVENTION

1. Field of the Invention

The present invention relates generally to multiuser network communications and more specifically to a multilingual collaborative network gaming system.

2. Introduction

Currently, multiple users can interact over a network such as the internet and each participates in the same virtual environment such as an internet game. Such an environment may involve multiple users at client devices, each communicating over a network with a central server in which commands are received from each client, and data is transmitted from the server to each individual client device such that each user is participating in a similar game simultaneously. Often, each user may be from different geographic areas or come from different cultures. Accordingly, what is needed in the art is an improved virtual environment which may accommodate users having different backgrounds and different geographic locations.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods and computer readable media for providing a collaborative communication environment. An exemplary method embodiment of the invention comprises receiving user profiles, establishing a collaborative communication environment wherein a plurality of users simultaneously interact over a network, converting data to be sent to each user in a collaborative environment based on the respective user's profile and presenting a localized user experience to each person using the converted data.

The principles of the invention may be utilized to provide, for example in a network gaming environment, an individualized user experience that may be better tailored to a user's culture, language, sensitivities, age and so forth. In this manner, as different users in different part of the world interact in a simultaneous environment such as an online game, features of that game that may be inappropriate for a particular user that may be in realtime modified such that users across different cultures and different sensibilities can, nevertheless, simultaneously interact via an online experience such as the game.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
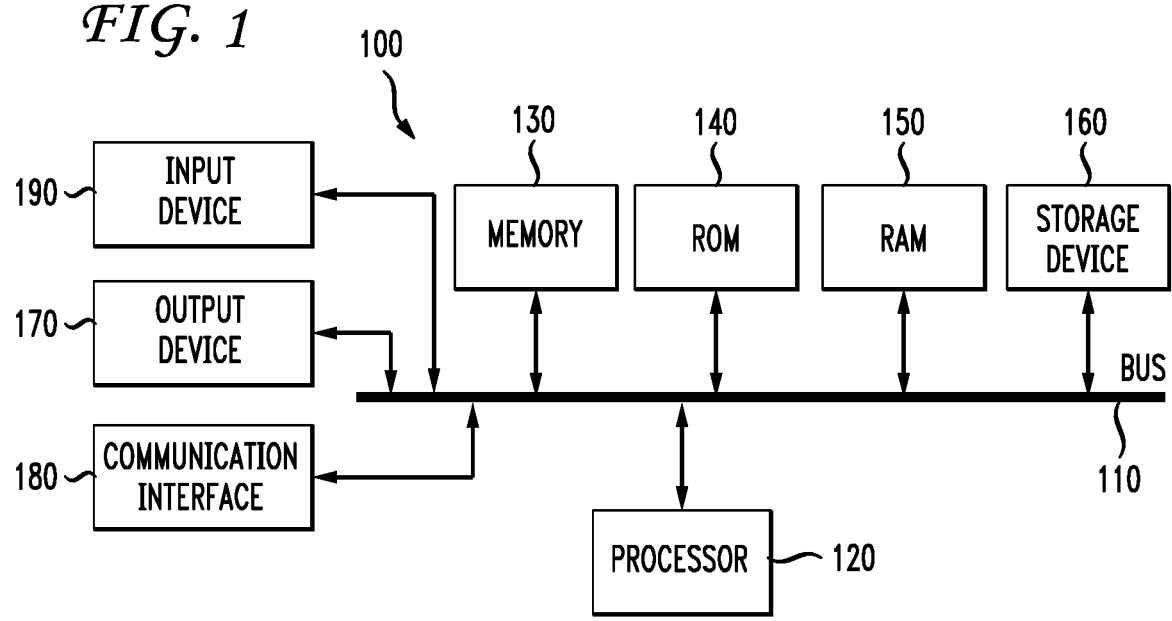
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
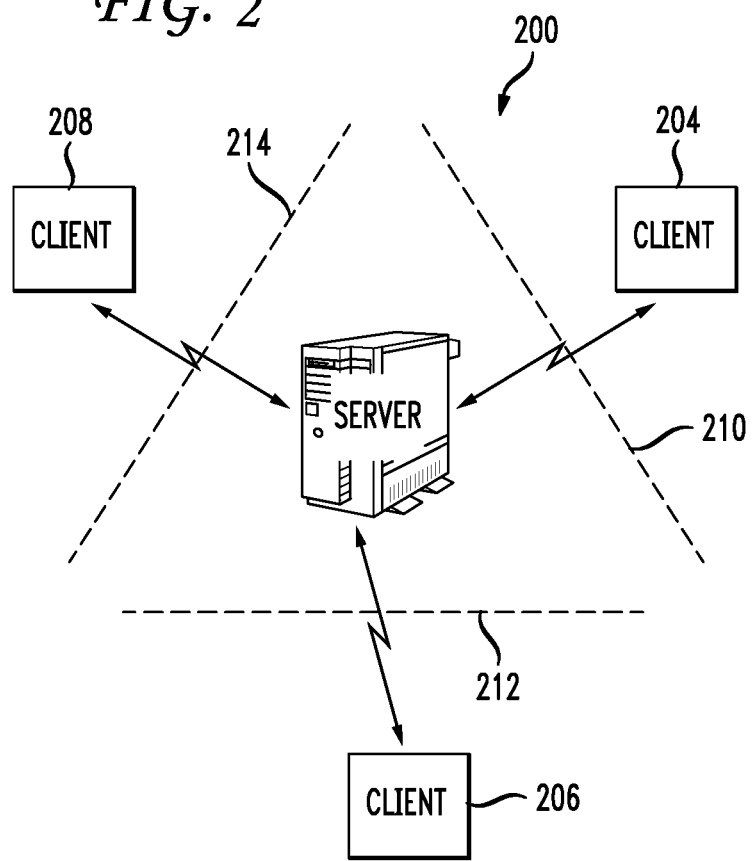
FIG. 2 illustrates an example server-client network in a collaborative network interaction.

The present invention relates to modifying output from a central data location within a network that provides for a unique experience to individual users. One preferred example and an application in which the present invention may be applied related to Internet video games. FIG. 2 illustrates basic example of a network 200 in which server 202 communicates simultaneously with client device 204, 206 and 208. These devices may be communicating with each other via the server through a local area network or a wide area network such as the Internet. Any type of network may be utilized to enable client devices 204, 206, 208 to communicate and transmit data back and forth to each other. It is generally irrelevant in terms of the present invention regarding the network used to implement the present invention. As noted above, in some cases the individual participants in a network game may come from different cultures or different geographic areas. Intermittent lines 210, 212, 214 in FIG. 2 are meant to illustrate that the various client devices are in geographically disperse areas. Therefore, in this regard, client device 204 may be in France, client device 206 may be in China, and client device 208 may be in the United States of America. In this scenario, each individual user may speak a different language, have a different culture and have different sensitivities to content that may be part of a video game. For example, some cultures may be more sensitive to depictions of violence. Each user from a distinct geographic location may nevertheless want to simultaneously play the same video game.

An aspect of the present invention enables individual cultural and language services which may be applied to gaming or other collaborative services in which players register with a network in advance of beginning to play a game. The information which may be retrieved from each user may include a preferred language, a location or preferred location, cultural information, potentially the individual's race, age, other personalized preferences, and so forth. Via the registration process, each user obtains a user profile which is stored in the network. The user profiles will influence the customization of controls, signals and data which are the basis for the interaction and the user experience between each individual user and the server. The customization may occur on specific games between specific players. For example, a French-speaking player may play games with an English-speaking player in such a network environment wherein the individual user experience for each player is customized such that the language is presented in French or English respectively. In some cases, the user may also be speaking as part of the gaming experience wherein an automatic speech recognition system may receive commands or other input from the user. In the dynamic customizable aspect of the present invention, the system will automatically utilize grammar that is appropriate for each individual user. For example, French grammar may be implemented to receive voice input from the French user and US grammar may be utilized to receive voice input from the US participant. Furthermore, realtime interactive data may also be influenced by individual user profiles such that if this French speaker, for example, yells out a command of "fire," the automatic speech recognition software may recognize that command, other known software will understand the meaning or task to be performed based on that command act on the command and cause a translation of that command to be output via text, speech or other speech-generating means. The user in the United States hears the word "fire" in English as well as both the US player and French player being able to experience in the environment the effects of that command being carried out, such as a gun being fired or some other event occurring.

Other aspects of the invention include automatic signaling and control conversion for multicultural displays in the context of a shared experience such as network gaming. In addition to language, current displays may not be appropriate for the individuals due to cultural differences noted above. The present architecture provides an environment for an experience between people from various countries or cultures. In addition, the network-based servers and the applications running thereon provide fairness for realtime exchanges of controls where each command or control signal is stamped and cued according to a single superframe wherein all moves and controls are considered. In this regard, there may be some aspects of a person's culture or geographic location in which various modifications may need to be made either in their user experience or the user experiences of other cultures or geographic locations such that their opportunity for competition in the gaming environment may need to be brought to a level playing field. Accordingly, the various controls and input from each individual user are analyzed at least in part based on the individual user profiles and perhaps other realtime data to provide a fair experience for all participants in the video game or other video collaborative multimedia experience.

The user profiles are used in realtime to dynamically adopt displays in the multimedia presentation in the single superframe. The present solution provides language, sound or phrase automatic conversion to match each individual user's desires. In this regard, the system provides information such as audio, an avatar or a virtual agent that may speak instructions or speak other kinds of information; each individual user will receive in their respective language and perhaps even in a particular dialect the converted data such that it matches that individual user's profile. The implementation of this approach may occur several different ways. For example, the system may generate via a gaming module or dialog module the base text which is to be spoken by an entity to each individual user. This text may then be transmitted to a particular module that is utilized to perform the conversion of data for each individual user. In this case, each individual module will process the text either for conversion to spoken language and/or other modification such that the basic text is converted appropriately and then transmitted to an appropriate text-to-speech module which generates the audible voice. Following on the example above, the French user may then receive what initially began as an English message, which is then converted to text, and the text in French is then sent to a text-to-speech module generated for the French language in which the audio is heard in French by that user.

Similarly, other cultural modifications may occur. For example, a particular scene may be generated in a base state. Would assume in such a scene that a condition occurs in which one of the players shoot a dragon. The basic scene information may be generated which would include the death of this dragon, which may be illustrated in the base form in a violent and bloody manner. The base scene illustration may then be processed by each individual module such that its parameters in that scene may be adjusted to reduce the level of violence in that particular scene for individual players of the game. Then the visual output for each individual player may be so modified such that essentially simultaneously each viewer will have an individual view of that particular action within the gaming environment in which the dragon was killed.

As can be appreciated, there may be many facets of the interactive experience which can be modified according to the principles of the invention. For example, in some cases the language used in a video game may be quite inappropriate to varying degrees in different cultures. For example, in this scenario if a particular player or virtual actor in the environment is to make a statement in the environment that is potentially offensive to either the culture or age of a participant and so on, then that language may be processed by an individual module that is processing data according to individual user profiles such that the language can be either reduced in its offensiveness or eliminated or replaced with less offensive and appropriate language. Thus, the particular virtual person in the gaming environment may say different things to each individual user, while maintaining the basic meaning of the message such that the collaboration of all the users will continue in the virtual environment.

Figure 3:
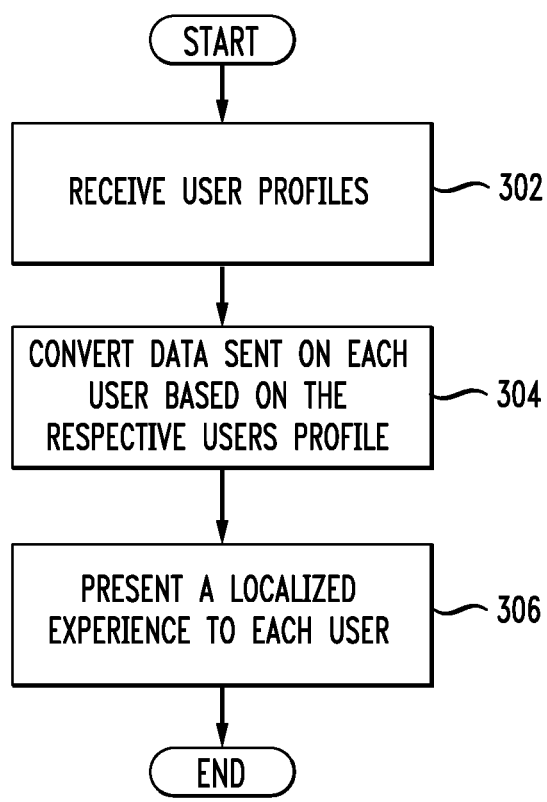
FIG. 3 illustrates a method embodiment of the invention.

FIG. 3 illustrates a method of monitoring the invention. The method is typically practiced within a computing environment such as that shown by the example in FIG. 2. In other words, the steps of the method will typically occur on a server or similarly configured device 202. The method comprises receiving user profiles (302). These will be typically received via the internet such that each individual user will go to a particular website for a particular environment such as a game and enter their user profile data. The method will typically involve establishing a collaborative communication environment where a plurality of users simultaneously interacts over a network, such as the internet. As has been noted, one example of such an environment is an internet video game in which multiple users can access a server or servers and in realtime play the internet game against each other. Next, the method comprises converting data sent to each user based on an expected user's profile (304). Various aspects of this have been discussed herein, wherein data that is generated, whether it be audio, video, multimedia or a combination of such data, that is to be sent to each individual user will be converted into the modified form based at least in part on the respective user's profile. Other factors may also be involved in converting the data, such as current geographic location of the user, if that is information that is available, and other realtime data. The method also comprised presenting a localized experience to each user (306) in the collaborative environment. Thus, in the collaborative interaction each user will have an experience that is more closely aligned with their particular culture, interests and sensibilities.

Figure 4:
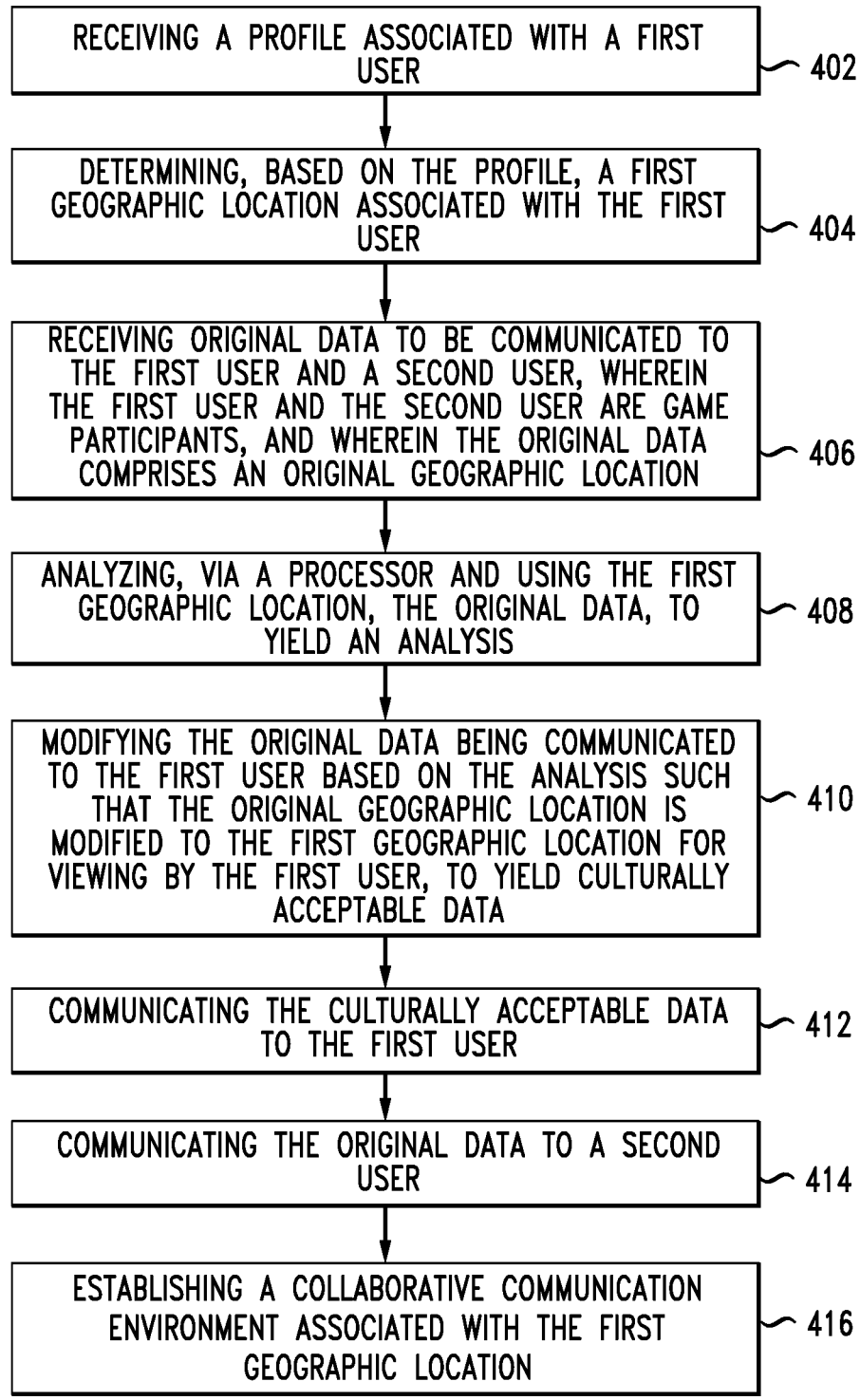
FIG. 4 illustrates another method embodiment.

FIG. 4 illustrates another embodiment of this disclosure. As shown, an example method includes receiving a profile associated with a first user (402), determining, based on the profile, a first geographic location associated with the first user (404), and receiving original data to be communicated to the first user and a second user, wherein the first user and the second user are game participants, and wherein the original data comprises an original geographic location (406). The method further includes analyzing, via a processor and using the first geographic location, the original data, to yield an analysis (408), modifying the original data being communicated to the first user based on the analysis such that the original geographic location is modified to the first geographic location for viewing by the first user, to yield culturally acceptable data (410), communicating the culturally acceptable data to the first user (412) and communicating the original data to a second user (414).

The method can further include modifying original data by removing, from the original data which is to be communicated, the original geographic location. Further, modifying the original data can also include normalizing the original data based on the quality in the gaming environment. Finally, the method could further include establishing a collaborative communication environment associated with the first geographic location (416).

Additional mechanisms may also be utilized in order to modify the individual experience of each user. For example, a sliding scale, slide bar, buttons, multi-modal input or other mechanisms may be employed such that dynamically in the middle of an online collaboration individual user feedback may be received such that a modification of the experience may be dynamically altered. For example, a sliding scale from 1-10 may be included on a user display that relates to a level of violence that the user is willing to tolerate in the context of the collaboration. Thus, if in the middle of an online game or other collaborative environment the user may manipulate a slider such that the data sent to that user is modified into reducing or increasing the particular parameter in response to the movement of the slider. Furthermore, other implicit input may also be utilized in the process of adjusting each user's experience. For example, an analysis may be performed on the skill level of the individual user such that upon meeting a certain threshold, the system would determine if the user is perhaps younger than a user profile indicates or that the system otherwise understood the user to be. In such a scenario, the system may then automatically reduce the level of violence or any other parameter that is associated with the particular user's interactive experience such that it matches implicitly the age of the user. Any type of user interaction may be received in order to make such determinations. For example, voice, temperature graphitic input and any other kind of multi-modal interaction may be received and analyzed for the purpose of determining whether to adjust the individual user experience.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, environments such as educational environments, business environments, religious environments and so forth may involve on-line collaboration in which cultural or individual via sensibilities may be taken into account in the presentation. Accordingly, the appended claims and their legal equivalents should only define the invention, rather than any specific examples given.

We claim:

1. A method comprising:
   receiving first geographic location data associated with a first physical location of a first user and second geographic location data associated with a second physical location of a second user;
   normalizing, via a normalization module and a processor, the first geographic location data such that the first geographic location data is modified according to visual characteristics of a preferred geographic location for viewing by the first user, to yield modified geographic location data, wherein the preferred geographic location is independent of the first physical location of the first user;
   communicating, via communication module, the modified geographic location data to a first device associated with the first user as part of a collaborative communication environment; and
   communicating the second geographic location data to a second user device associated with the second user as part of the collaborative communication environment, wherein the communicating of the modified geographic location data and the communicating of the second geographic location data each occur prior to the first user and the second user taking part in the collaborative communication environment.

2. The method of claim 1, wherein the collaborative communication environment comprises a gaming environment accessed by the first user and the second user.

3. The method of claim 1, further comprising:
   determining, based on a profile, the preferred geographic location associated with the first user.

4. The method of claim 3, further comprising:
   receiving original data to be communicated to the first user and the second user, wherein the first user and the second user are game participants in a gaming environment operating on a gaming computer system.

5. The method of claim 4, wherein the original data references an original geographic location.

6. The method of claim 5, further comprising:
   modifying the original data being communicated to the first device based on an analysis of the preferred geographic location and the original data.

7. The method of claim 1, wherein modifying the original data comprises removing, from the original data which is to be communicated, the original geographic location.

8. A system comprising:
   a processor;
   a normalization module; and
   a computer-readable storage device having instructions stored which, when executed by the processor, cause the processor to perform operations comprising:
      receiving first geographic location data associated with a first physical location of a first user and second geographic location data associated with a second physical location of a second user;
      normalizing, via a normalization module, the first geographic location data such that the first geographic location data is modified according to visual characteristics of a preferred geographic location for viewing by the first user, to yield modified geographic location data, wherein the preferred geographic location is independent of the first physical location of the first user;

communicating the modified geographic location data to a first device associated with the first user as part of a collaborative communication environment; and communicating the second geographic location data to a second user device associated with the second user as part of the collaborative communication environment, wherein the communicating of the modified geographic location data and the communicating of the second geographic location data each occur prior to the first user and the second user taking part in the collaborative communication environment.

9. The system of claim 8, wherein the collaborative communication environment comprises a gaming environment accessed by the first user and the second user.

10. The system of claim 8, wherein the computer-readable storage device stores additional instructions which, when executed by the processor, cause the processor to perform operations further comprising:

determining, based on a profile, the preferred geographic location associated with the first user.

11. The system of claim 10, wherein the computer-readable storage device stores additional instructions which, when executed by the processor, cause the processor to perform operations further comprising:

receiving original data to be communicated to the first user and the second user, wherein the first user and the second user are game participants in a gaming environment operating on a gaming computer system.

12. The system of claim 11, wherein the original data references an original geographic location.

13. The system of claim 12, wherein the computer-readable storage device stores additional instructions which, when executed by the processor, cause the processor to perform operations further comprising:

modifying the original data being communicated to the first device based on an analysis of the preferred geographic location and the original data.

14. The system of claim 8, wherein modifying the original data comprises removing, from the original data which is to be communicated, the original geographic location.

15. A computer-readable storage device having instructions stored which, when executed on a computing device, cause the computing device to perform operations comprising:

receiving first geographic location data associated with a first physical location of a first user and second geographic location data associated with a second physical location of a second user;

normalizing, via a normalization module, the first geographic location data such that the first geographic location data is modified according to visual characteristics of a preferred geographic location for viewing by the first user, to yield modified geographic location data, wherein the preferred geographic location is independent of the first physical location of the first user;

communicating the modified geographic location data to a first device associated with the first user as part of a collaborative communication environment; and communicating the second geographic location data to a second user device associated with the second user as part of the collaborative communication environment, wherein the communicating of the modified geographic location data and the communicating of the second geographic location data each occur prior to the first user and the second user taking part in the collaborative communication environment.

16. The computer-readable storage device of claim 15, wherein the collaborative communication environment comprises a gaming environment accessed by the first user and the second user.

17. The computer-readable storage device of claim 15, wherein the computer-readable storage device stores additional instructions which, when executed on the computing device, cause the computing device to perform operations further comprising:

determining, based on a profile, the preferred geographic location associated with the first user.

18. The computer-readable storage device of claim 17, wherein the computer-readable storage device stores additional instructions which, when executed on the computing device, cause the computing device to perform operations further comprising:

receiving original data to be communicated to the first user and the second user, wherein the first user and the second user are game participants in a gaming environment operating on a gaming computer system.

19. The computer-readable storage device of claim 18, wherein the original data references an original geographic location.

20. The computer-readable storage device of claim 19, wherein the computer-readable storage device stores additional instructions which, when executed on the computing device, cause the computing device to perform operations further comprising:

modifying the original data being communicated to the first device based on an analysis of the preferred geographic location and the original data.

* * * * *